(12) United States Patent
Grunwald et al.

(10) Patent No.: US 10,399,434 B2
(45) Date of Patent: Sep. 3, 2019

(54) METHOD AND COMPUTER FOR CONTROLLING THE PRESSURE INSIDE A MOTOR VEHICLE FUEL TANK

(71) Applicants: CONTINENTAL AUTOMOTIVE FRANCE, Toulouse (FR); CONTINENTAL AUTOMOTIVE GMBH, Hannover (DE); AUDI AG, Ingolstadt (DE)

(72) Inventors: Oliver Grunwald, Buxheim (DE); Thierry Collet, Fontenilles (FR); Aurelien Groussard, Toulouse (FR)

(73) Assignees: CONTINENTAL AUTOMOTIVE FRANCE, Toulouse (FR); CONTINENTAL AUTOMOTIVE GMBH, Hannover (DE); AUDI AG, Ingolstadt (DE)

( * ) Notice: Subject to any disclaimer, the term of this patent is extended or adjusted under 35 U.S.C. 154(b) by 0 days.

(21) Appl. No.: 15/737,348

(22) PCT Filed: Jun. 23, 2016

(86) PCT No.: PCT/FR2016/051543
§ 371 (c)(1),
(2) Date: Dec. 18, 2017

(87) PCT Pub. No.: WO2016/207556
PCT Pub. Date: Dec. 29, 2016

(65) Prior Publication Data
US 2018/0170173 A1     Jun. 21, 2018

(30) Foreign Application Priority Data
Jun. 25, 2015   (FR) ..................... 15 55868

(51) Int. Cl.
*F02M 33/02* (2006.01)
*B60K 15/035* (2006.01)
(Continued)

(52) U.S. Cl.
CPC ...... *B60K 15/035* (2013.01); *B60K 15/03519* (2013.01); *F02M 25/08* (2013.01);
(Continued)

(58) Field of Classification Search
CPC ............ B60K 15/035; B60K 15/03519; B60K 2015/03302; B60K 2015/0321;
(Continued)

(56) References Cited

U.S. PATENT DOCUMENTS

2011/0295482 A1   12/2011  Pearce et al.
2012/0160220 A1   6/2012   Hagen

FOREIGN PATENT DOCUMENTS

EP       1 707 422 A1     10/2006
WO       2012/100039 A1   7/2012

OTHER PUBLICATIONS

International Search Report, dated Sep. 19, 2016, from corresponding PCT/FR2016/051543 application.

*Primary Examiner* — Hai H Huynh
(74) *Attorney, Agent, or Firm* — Young & Thompson

(57) ABSTRACT

Disclosed is a method for controlling the pressure inside a fuel tank of a motor vehicle, the motor vehicle including a fuel vapor vent circuit connecting the tank to a fuel vapor canister, the vent circuit including an isolation valve for isolating the tank and a rollover valve. The pressure control method includes steps of: determining an activation duration required for the isolation valve to transition from a closed state to a fully open state, referred to as the "full opening duration", when a predefined rollover valve closure risk criterion is satisfied: controlling the isolation valve in (Continued)

Figure 1:
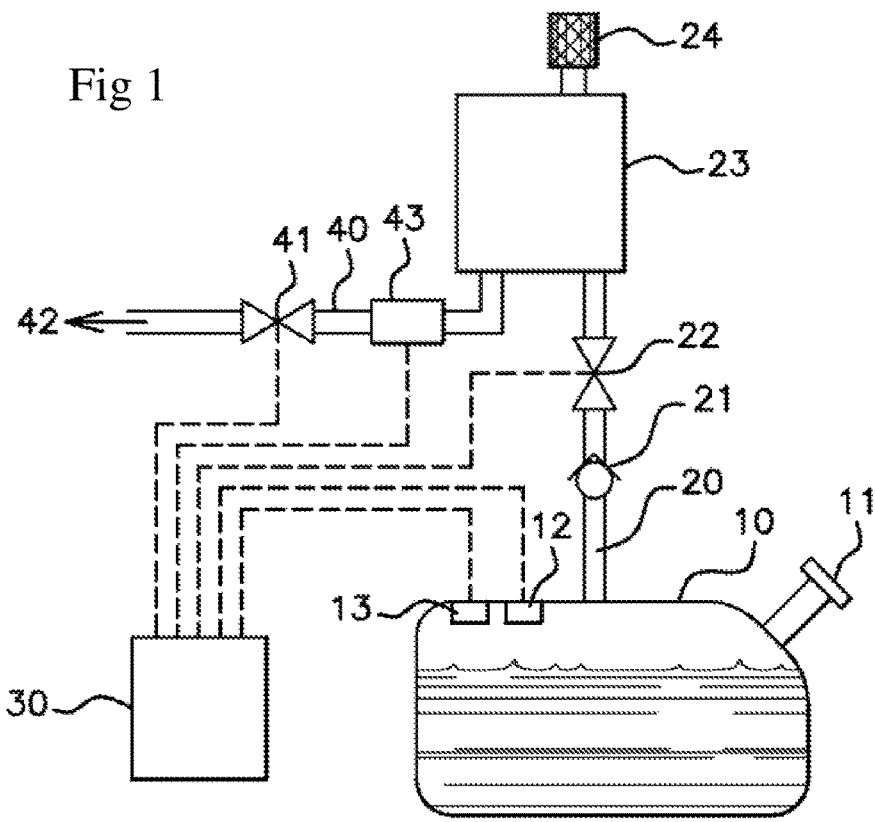

repeated activations of respective durations that are shorter than the full opening duration.

20 Claims, 2 Drawing Sheets

(51) Int. Cl.
F02M 25/08 (2006.01)
F02M 37/22 (2019.01)
B60K 15/03 (2006.01)

(52) U.S. Cl.
CPC ..... *F02M 37/22* (2013.01); *B60K 2015/0321* (2013.01); *B60K 2015/03302* (2013.01); *B60K 2015/03514* (2013.01); *B60K 2015/03561* (2013.01); *B60K 2015/03576* (2013.01)

(58) Field of Classification Search
CPC ........... B60K 2015/03514; B60K 2015/03576; B60K 2015/03561; F02M 37/22; F02M 25/08
USPC ........................................ 123/516, 518, 520
See application file for complete search history.

METHOD AND COMPUTER FOR CONTROLLING THE PRESSURE INSIDE A MOTOR VEHICLE FUEL TANK

The present invention lies within the field of motor control for motor vehicles, and more particularly concerns a method and a computer for controlling the pressure inside a motor vehicle fuel tank.

In this day and age, it is common to equip the fuel tanks of motor vehicles having internal combustion engines with fuel vapor vent circuits, particularly motor vehicles equipped with gasoline engines.

In a known manner, a fuel vapor vent circuit connects the fuel tank to a fuel vapor filter ("canister" in the English literature), generally an active carbon filter, which captures the fuel vapors.

This canister is further connected to an air intake and a purge circuit which reinjects the captured fuel vapor back to the engine, via a purge valve.

Particularly in the case of motor vehicles equipped with hybrid internal combustion/electric engines, or internal combustion engines controlled by a start-stop management process, the operating time of the internal combustion engine is reduced and may be insufficient to purge the fuel vapor stored in the canister.

For this purpose, it is known to place a fuel tank isolation valve (FTIV) on the fuel vapor vent circuit. This isolation valve is for example controlled to allow venting the fuel vapor when the internal combustion engine is running, and to hold the fuel vapors inside the tank when the engine is stopped. The tank is then sized to support a higher pressure than in motor vehicles having no such isolation valve.

However, it is necessary to control the pressure within the tank to ensure that the maximum pressure supported by said tank is never exceeded. It is also necessary to control the pressure inside the tank prior to filling, in order to bring this pressure to ambient pressure prior to opening the tank's fuel filler cap. In this case, the decrease in pressure must be rapid as well, to prevent the driver from having to wait too long before opening said cap.

The fuel vapor vent circuit also includes a rollover valve (ROV). The rollover valve is designed to prevent fuel from escaping the tank when the motor vehicle rolls over. The rollover valve closes automatically when the motor vehicle rolls over.

One disadvantage is that, when one wishes to quickly reduce the pressure inside the tank by opening the isolation valve, the rollover valve tends to close. Once closed, the rollover valve takes considerable time to reopen, a time during which the vent circuit is also closed, increasing the time required to reduce the pressure inside the tank to ambient pressure.

The present invention aims to overcome all or part of the limitations of the prior art solutions, in particular those outlined above, by proposing a solution which allows optimizing the time to decrease the pressure inside the tank, and more particularly just before filling said tank.

To this end, and according to a first aspect, the invention relates to a method for controlling the pressure inside a fuel tank of a motor vehicle, said motor vehicle comprising a fuel vapor vent circuit connecting the tank to a fuel vapor canister, the vent circuit comprising an isolation valve for isolating the tank and a rollover valve, the pressure inside the tank being controlled by controlling the isolation valve. Advantageously, the method comprises steps of:

determining an activation duration required for the isolation valve to transition from a closed state to a fully open state, referred to as the "full opening duration", when a predefined rollover valve closure risk criterion is satisfied: controlling the isolation valve in repeated activations of respective durations that are shorter than the full opening duration.

Because the activation durations of the isolation valve are shorter than the full opening duration, said isolation valve is never activated long enough to reach the fully open state. The isolation valve is therefore only partially open and the flow through said isolation valve is never at its maximum, which reduces the rollover valve closure risk.

In some particular modes of implementation, the pressure control method may further comprise one or more of the following features, separately or in any of the technically possible combinations.

In some particular modes of implementation, the pressure control method comprises a step of determining a closure-initiating flow rate of the rollover valve, and a step of determining a maximum instantaneous flow rate of the isolation valve in the fully open state. The predefined rollover valve closure risk criterion is then satisfied when the closure-initiating flow rate is less than the maximum instantaneous flow rate.

Such arrangements serve to better comprehend the rollover valve closure risk, as they take into account:
the closure-initiating flow rate of the rollover valve, meaning the flow rate above which the rollover valve will close even if the motor vehicle has not rolled,
the maximum instantaneous flow rate of the isolation valve, meaning the maximum possible flow rate through said isolation valve when considering the operating conditions of said isolation valve at the moment of activation considered.

In some particular modes of implementation, the duration of an activation of the isolation valve, when the rollover valve closure risk criterion is satisfied, is determined as a function of the ratio R between the closure-initiating flow rate and the maximum instantaneous flow rate.

Such arrangements serve to better adapt the activation durations of the isolation valve, for example by decreasing said durations when the ratio R is low (meaning when the closure-initiating flow rate is much lower than the maximum instantaneous flow rate).

In some particular modes of implementation, the duration Ton of an activation of the isolation valve, when the rollover valve closure risk criterion is satisfied, is determined according to the following expression:

$$Ton = K \cdot Tmin + R \cdot Topen$$

where:
Tmin is the activation duration required for the isolation valve to begin to open from the closed state,
Topen is the activation duration required for the isolation valve to open fully, starting from the moment when said isolation valve began to open,
K is a positive coefficient less than or equal to one ($0 \leq K \leq 1$).

In some particular modes of implementation, the maximum instantaneous flow rate is determined as a function of the pressure Pt inside the tank and the pressure Pc in the vent circuit after the isolation valve.

In some particular modes of implementation, the maximum instantaneous flow rate Qinst is determined according to the following expression:

$$Qinst = 295 \cdot Cv \cdot \sqrt{\frac{Pt^2 - Pc^2}{\rho \cdot T}}$$

where:

Cv is the coefficient of the isolation valve,

ρ is the density of the fuel vapors relative to air,

T is the temperature inside the tank.

In some particular modes of implementation, when the rollover valve closure risk criterion is satisfied, the time separating the end of one activation of the isolation valve and the beginning of the next activation is greater than the time required for said isolation valve to transition from the fully open state to the closed state.

In some particular modes of implementation, when the rollover valve closure risk criterion is not satisfied, the isolation valve is activated continuously.

According to a second aspect, the invention relates to an electronic computer of a motor vehicle comprising means configured to control the pressure, inside a fuel tank of said motor vehicle, in accordance with a method according to any one of the modes of implementation of the invention.

According to a third aspect, the invention relates to a motor vehicle comprising an electronic computer according to any one of the embodiments of the invention.

Figure 2:
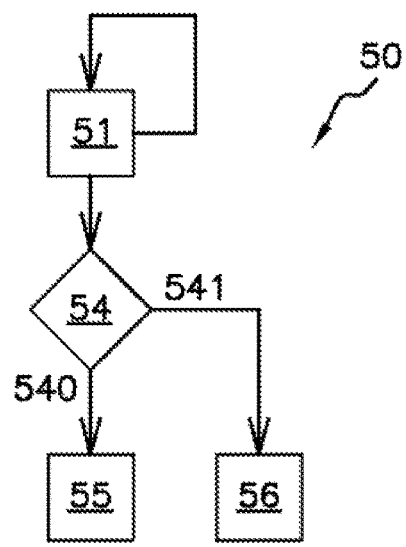
Figure 3:
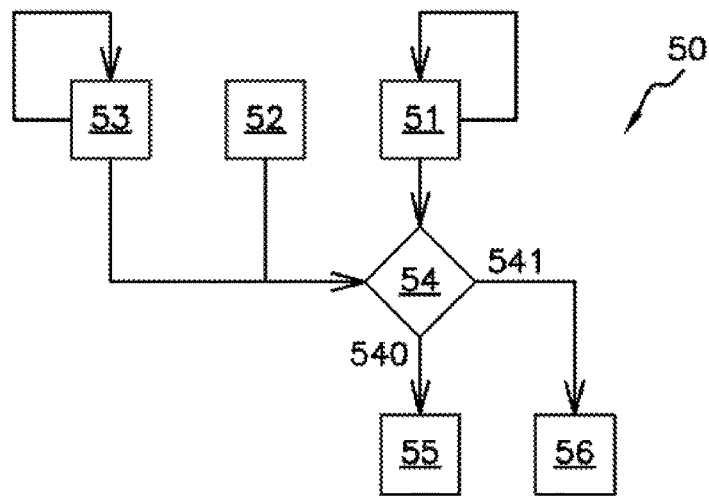
Figure 4:
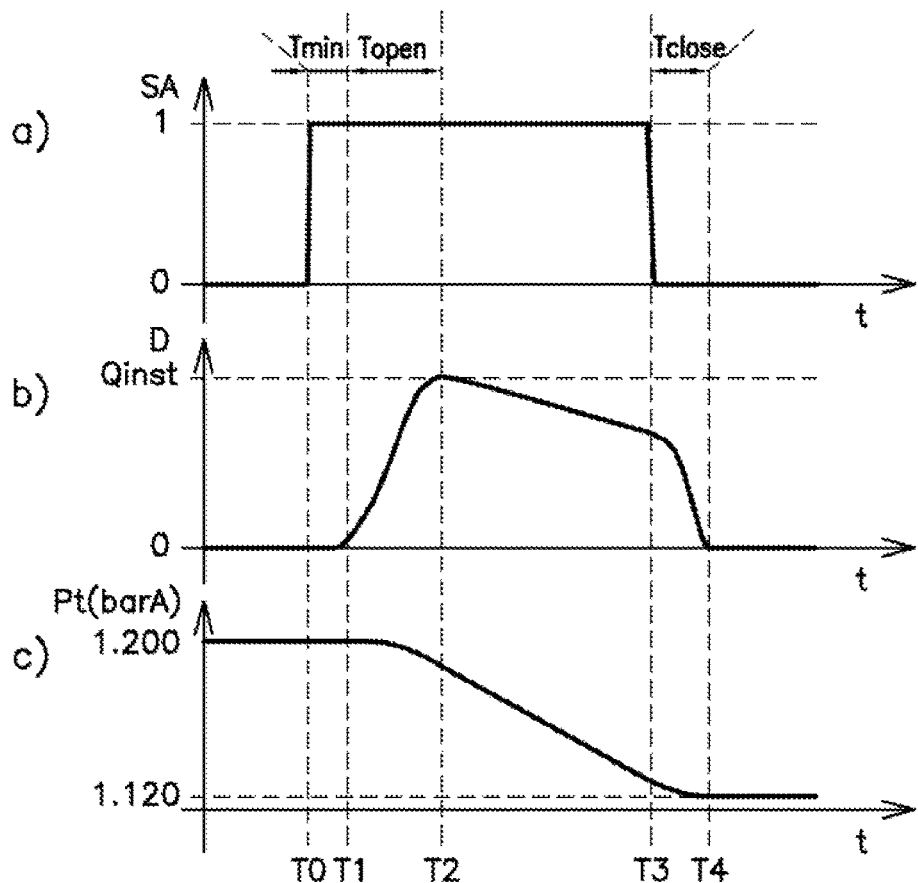

The invention will be better understood from reading the following description given by way of non-limiting example and with reference to the figures which represent:

FIG. 1: a schematic representation of a fuel vapor vent circuit of a tank of a motor vehicle, FIG. 2: a diagram illustrating the general principle of a pressure control method according to the invention, FIG. 3: a diagram illustrating a preferred mode of implementation of a pressure control method, FIG. 4: curves illustrating the behavior over time of an isolation valve during an activation.

In these figures, the same references from one figure to another denote identical or similar elements. For clarity, the elements depicted are not to scale unless otherwise specified.

FIG. 1 schematically represents an embodiment of a fuel vapor vent circuit 20, in particular for gasoline vapor, of a fuel tank 10 of a motor vehicle.

As illustrated by FIG. 1, the fuel vapor vent circuit 20 connects the tank 10 to a fuel vapor filter or canister 23. The canister 23 also comprises an air intake 24, such that the pressure at said canister 23 substantially corresponds to the ambient pressure, i.e. atmospheric pressure.

Between the tank 10 and the canister 23, the fuel vapor vent circuit 20 comprises a rollover valve 21 (ROV) and an isolation valve 22 (FTIV).

The isolation valve 22 is by default in a closed state in which no fuel vapor can flow from the tank 10 to the canister 23, and an activation of said isolation valve 22 causes it to progressively transition from the closed state to a fully open state. When the isolation valve 22 is open, fuel vapors escape from the tank 10 towards the canister 23, because of the pressure difference between said tank 10 and said canister 23.

As illustrated by FIG. 1, the opening/closing of the isolation valve 22, in order to control the pressure inside the tank 10, is controlled by an electronic computer 30.

The electronic computer 30 comprises for example at least one processor and at least one memory in which is stored a computer program product in the form of a set of program code instructions to be executed in order to implement the various steps of a method 50 for controlling the pressure inside the tank 10. In a variant, the electronic computer 30 has one or more programmable logic circuits such as FPGA, PLD, etc., and/or specialized integrated circuits (ASIC), adapted to implement all or part of said steps of the method 50 for controlling the pressure inside the tank 10.

In other words, the electronic computer 30 comprises a set of software means (specific computer program product) and/or hardware means (FPGA, PLD, ASIC, etc.) configured to implement the method 50 for controlling the pressure inside the tank 10.

The canister 23 is also connected, in the example illustrated by FIG. 1, to an air intake manifold 42 of a internal combustion engine of the motor vehicle, by means of a purge circuit 40 of the canister 23. The purge circuit 40 comprises in particular a purge valve 41, for example controlled by the electronic computer 30. When the purge valve 41 is closed, no fuel vapor flows between the canister 23 and the intake manifold 42 of the engine. When the purge valve 41 is opened, the fuel vapor captured by the canister 23 can be purged to the intake manifold 42 of the engine, which is at a pressure lower than the ambient pressure at the air intake 24 of the canister 23.

The pressure control method 50 according to the invention is particularly suitable for controlling the pressure, prior to opening the fuel cap 11 of the tank 10 in order to fill said tank 10 with fuel. As noted above, the pressure decrease inside the tank 10 must then be rapid so that the driver does not have to wait too long before opening the fuel cap 11. Nothing, however, precludes using the method 50 of the invention for other operations for controlling pressure within the tank 10, in particular to prevent it from exceeding the maximum pressure supported by said tank 10.

FIG. 2 schematically represents the main steps of a method 50 for controlling the pressure within the tank 10.

As shown by FIG. 2, the pressure control method 50 first comprises a step 51 of determining an activation duration necessary to transition the isolation valve 22 from a closed state to a fully open state, called the "full opening duration."

Indeed, as noted above, when activated, the isolation valve 22 gradually transitions from the closed state to the fully open state. The flow through said isolation valve 22 thus gradually increases from zero (isolation valve 22 in the closed state) to a maximum value (isolation valve 22 in the fully open state), called the "maximum instantaneous flow rate" Qinst, which depends on the operating conditions at the moment of activation of said isolation valve 22.

The full opening duration can be determined prior to commissioning the vehicle, or during commissioning, and stored once and for all in a memory of the electronic computer 30. It should be noted that the full opening duration may depend on the operating conditions of the isolation valve 22 (temperature, battery voltage, pressure differential across the isolation valve 22, etc.) at the time of activation. Where appropriate, multiple values for the full opening duration, respectively associated with different operating conditions of said isolation valve 22, can be determined beforehand and stored.

However, the full opening duration can change over time, in particular due to aging of the isolation valve 22. In preferred modes of implementation, and as illustrated in FIG. 2, the step 51 of determining the full opening duration is executed in a recurring manner, in order to update the value of said full opening duration and better reflect the aging of the isolation valve 22.

The pressure control method 50 also comprises a step 54 of determining whether a predefined rollover valve 21 closure risk criterion is satisfied.

When the rollover valve 21 closure risk criterion is satisfied (reference 540 in FIG. 2), the method 50 includes a step 55 of controlling the isolation valve 22 in repeated activations of respective durations that are shorter than the full opening duration. The isolation valve 22 is thus never activated long enough to transition to the fully open state. The maximum instantaneous flow rate Qinst through the isolation valve 22 is therefore never reached and the rollover valve 21 closure risk is greatly reduced.

Several forms can be considered for the rollover valve 21 closure risk criterion. In particular, we can assume that there is always a rollover valve closure risk, such that the rollover valve 21 closure risk criterion is always considered satisfied. Where appropriate, the isolation valve 22 is always controlled by repeated activations of respective durations shorter than the full opening duration.

Preferably, and as illustrated in FIG. 2, the rollover valve 21 closure risk criterion is not always satisfied, and depends for example on the operating conditions at the moment of activation of the isolation valve 22. In this case, when the risk criterion for rollover valve 21 closure is not satisfied (reference 541 in FIG. 2), the pressure control method 50 comprises for example a control step 56 during which the isolation valve 22 is activated continuously. Thus, in the absence of any risk of rollover valve 21 closure, we advantageously obtain the maximum instantaneous flow rate Qinst of the isolation valve 22 in order to rapidly reduce the pressure inside the tank 10. The isolation valve 22 can be activated continuously until the pressure within the tank 10 reaches a predetermined value or stops decreasing because it has reached ambient pressure.

Several forms can be considered for a rollover valve 21 closure risk criterion that is not always satisfied.

For example, the rollover valve 21 closure risk criterion can be considered satisfied when the time elapsed since the date of the last activation of the isolation valve 22 is greater than a predetermined threshold value.

In another example, the rollover valve 21 closure risk criterion can be considered satisfied when the pressure Pt inside the tank 10 exceeds a predetermined threshold value, or when the difference between the pressure Pt inside the tank 10 and the pressure Pc in the vent circuit 20 after the isolation valve 22 (which substantially corresponds to ambient pressure) is greater than a predetermined threshold value. Where appropriate, and as illustrated by FIG. 1, the electronic computer 30 is connected to a pressure sensor 12 for the tank 10, and optionally to an ambient pressure sensor 43 (arranged, in the example of FIG. 1, in the purge circuit 40 between the fuel vapor canister 23 and the purge valve 41).

FIG. 3 schematically represents a preferred mode of implementation, wherein the pressure control method 50 comprises, in addition to the steps described with reference to FIG. 2, the steps of:
  52: determining a closure-initiating flow rate Qmax of the rollover valve 21,
  53: determining the maximum instantaneous flow rate Qinst of the isolation valve 22.

The rollover valve 21 closure risk criterion is, in this case, considered to be satisfied when the closure-initiating flow rate Qmax of the rollover valve 21 is lower than the maximum instantaneous flow rate Qinst of the isolation valve 22.

The closure-initiating flow rate Qmax of the rollover valve 21 corresponds to the flow rate above which the rollover valve 21 will close even if the motor vehicle has not rolled. The closure-initiating flow rate Qmax of the rollover valve 21 is typically data provided by the manufacturer, or can be obtained by calibration and/or experimentation.

The maximum instantaneous flow rate Qinst of the isolation valve 22 is the maximum possible flow rate through said isolation valve 22 at the moment of activation considered. The maximum instantaneous flow rate Qinst is preferably estimated just before activating the isolation valve 22, according to the operating conditions of said isolation valve at the moment of activation considered.

Preferably, and as illustrated in FIG. 3, the step 53 of determining the maximum instantaneous flow rate Qinst is executed in a recurring manner in order to reflect changing operating conditions during implementation of the pressure control method 50. In particular, the maximum instantaneous flow rate Qinst will decrease with a progressive decrease of the pressure inside the tank 10. Thus, the rollover valve 21 closure risk criterion, initially satisfied, will no longer be satisfied after a certain amount of time, then enabling the isolation valve 22 to remain continuously open.

The maximum instantaneous flow rate Qinst is for example estimated on the basis of at least one of the following operating conditions:
  the pressure Pt inside the tank 10 (as measured by the pressure sensor 12 inside the tank),
  the pressure Pc in the vent circuit 20 after the isolation valve 22 (for example measured by the ambient pressure sensor 43 arranged in the purge circuit 40),
  the temperature inside the tank 10 (if applicable, measured by a temperature sensor 13 connected to the electronic computer 30),
  the density of the fuel vapors relative to air.

In preferred modes of implementation, the maximum instantaneous flow rate Qinst is determined at least as a function of the pressure Pt in the tank 10 and of the pressure Pc after the isolation valve 22 relative to the tank 10 (which substantially corresponds to the ambient pressure), and possibly as a function of other operating conditions. For example, the maximum instantaneous flow rate Qinst is determined according to the following expression:

$$Qinst = 295 \cdot Cv \cdot \sqrt{\frac{Pt^2 - Pc^2}{\rho \cdot T}}$$

where:
  Cv is the coefficient of the isolation valve 22, generally provided by the manufacturer, which represents the number of US gallons of gas passing through the isolation valve 22 per minute, causing a head loss of one psi ("pound force per square inch")
  $\rho$ is the density of the fuel vapors relative to air,
  T is the temperature inside the tank 10, expressed in Kelvin.

In preferred modes of implementation, the duration of each activation of the isolation valve 22, when the rollover valve 21 closure risk criterion is satisfied, is determined as a function of the ratio R between the closure-initiating flow rate Qmax and the maximum instantaneous flow rate Qinst, R=Qmax/Qinst. Advantageously, the duration of each activation is determined by an increasing function of said ratio R, such that said activation duration decreases as the ratio R decreases and vice versa. Therefore, the ratio between said activation duration and the full opening duration of the isolation valve 22 decreases as the ratio R decreases and vice versa. As a result, the greater the risk that the rollover valve 21 will close (small ratio R), the smaller the activation duration will be in comparison to the full opening duration, such that the flow through the isolation valve 22 will be further limited.

FIG. 4 shows curves illustrating the behavior over time of an isolation valve 22 during activation.

Specifically, part a) represents an activation signal SA for an isolation valve 22, which is zero when the isolation valve 22 is not activated and is one when the isolation valve is activated.

Part b) shows the flow D through the isolation valve 22.

Part c) shows the pressure Pt within the tank 10, expressed in absolute bars (barA).

As illustrated in part a) of FIG. 4, activation of the isolation valve 22 starts at time T0. However, one will observe in part b) of FIG. 4 that the isolation valve 22 only starts to open at time T1, at which moment the flow D, initially zero, begins to increase. Tmin denotes the activation duration required for the isolation valve 22 to start opening from the closed state (Tmin=T1−T0).

Starting at time T1, the flow D gradually increases until reaching the maximum instantaneous flow rate Qinst at time T2. The pressure Pt decreases gradually and, at time T2, the gradient of the pressure Pt within the tank 10 is at maximum. Topen denotes the activation duration required for the isolation valve 22 to fully open, starting from time T1 when said isolation valve 22 began to open (Topen=T2−T1).

The duration Ton of an activation of the isolation valve 22, when the rollover valve 21 closure risk criterion is satisfied, can be determined solely on the basis of the ratio R and the duration Topen (equivalent to considering the full opening duration of the isolation valve 22 as corresponding to the duration Topen), for example according to the expression Ton=R·Topen. The activation duration Ton can also be determined on the basis of the ratio R, the duration Tmin, and the duration Topen (equivalent to considering that the full opening time of the isolation valve 22 corresponds to the sum of durations Tmin and Topen), for example according to the expression Ton=Tmin+R·Topen.

More generally, the activation duration Ton of the isolation valve 22, when the rollover valve 21 closure risk criterion is satisfied, can be determined according to the following expression:

$$Ton = K \cdot Tmin + R \cdot Topen$$

where K is a positive coefficient less than or equal to one, in other words
0≤K≤1.

In such modes of implementation, the duration Topen, and possibly the duration Tmin, are estimated during step 51 of determining the full opening duration. The duration Tmin is for example estimated by measuring times T0 and T1, time T1 corresponding to the time at which the pressure Pt inside the tank 10 begins to decrease. The duration Topen is for example estimated by measuring times T1 and T2, time T2 corresponding to the time at which the gradient of the pressure Pt inside the tank 10 becomes constant.

As illustrated in FIG. 4, activation of the isolation valve 22 ends at time T3. However, the isolation valve 22, in the fully open state at time T3, reaches the closed state at time T4. The flow D decreases gradually from time T3 until it disappears at time T4. Tclose denotes the duration required for said isolation valve 22 to transition from the fully open state to the closed state in the absence of activation (Tclose=T4−T3).

Preferably, when the rollover valve 21 closure risk criterion is satisfied, the time separating the end of one activation of the isolation valve 22 and the beginning of the next activation is greater than the duration Tclose, to ensure that the isolation valve 22 can close between two successive activations. For example, the duration Tclose can be estimated. Alternatively, successive activations of the isolation valve 22, when the rollover valve 21 closure risk criterion is satisfied, may be performed with an arbitrarily long period, for example about a second, when it is known beforehand that this will enable the isolation valve 22 to close between two successive activations.

The invention claimed is:

1. Method (50) for controlling the pressure inside a fuel tank (10) of a motor vehicle, said motor vehicle comprising a fuel vapor vent circuit (20) connecting the tank (10) to a canister (23), the vent circuit (20) comprising an isolation valve (22) for isolating the tank (10) and a rollover valve (21), the pressure inside the tank (10) being controlled by controlling the isolation valve (22), wherein said method (50) comprises steps of:
   (51) determining an activation duration required for the isolation valve (22) to transition from a closed state to a fully open state, referred to as the "full opening duration",
   when a predefined rollover valve (21) closure risk criterion is satisfied: (55) controlling the isolation valve (22) in repeated activations of respective durations that are shorter than the full opening duration.

2. Method (50) according to claim 1, wherein it comprises the steps of:
   (52) determining a closure-initiating flow rate of the rollover valve (21),
   (53) determining a maximum instantaneous flow rate (Qinst) of the isolation valve (22) in the fully open state,
   and wherein the predefined rollover valve (21) closure risk criterion is satisfied when the closure-initiating flow rate of the rollover valve (21) is less than the maximum instantaneous flow rate of the isolation valve (22).

3. Method (50) according to claim 2, wherein the duration of an activation of the isolation valve (22), when the rollover valve (21) closure risk criterion is satisfied, is determined as a function of the ratio R between the closure-initiating flow rate and the maximum instantaneous flow rate (Qinst).

4. Method (50) according to claim 3, wherein the duration Ton of an activation of the isolation valve (22), when the rollover valve (21) closure risk criterion is satisfied, is determined according to the following expression:

$$Ton = K \cdot Tmin + R \cdot Topen$$

where:
   Tmin is the activation duration required for the isolation valve (22) to begin to open from the closed state,
   Topen is the activation duration required for the isolation valve (22) to fully open, starting from the moment when said isolation valve began to open,
   K is a positive coefficient less than or equal to one.

5. Method (50) according to claim 4, wherein the maximum instantaneous flow rate (Qinst) is determined as a function of the pressure Pt inside the tank (10) and the pressure Pc in the vent circuit (20) after the isolation valve (22).

6. Method (50) according to claim 4, wherein, when the rollover valve (21) closure risk criterion is satisfied, the time separating the end of one activation of the isolation valve (22) and the beginning of the next activation is greater than the time required for said isolation valve to transition from the fully open state to the closed state.

7. Method (50) according to claim 4, wherein, when the rollover valve (21) closure risk criterion is not satisfied, the isolation valve (22) is activated continuously.

8. Method (50) according to claim 3, wherein the maximum instantaneous flow rate (Qinst) is determined as a function of the pressure Pt inside the tank (10) and the pressure Pc in the vent circuit (20) after the isolation valve (22).

9. Method (50) according to claim 3, wherein, when the rollover valve (21) closure risk criterion is satisfied, the time separating the end of one activation of the isolation valve (22) and the beginning of the next activation is greater than the time required for said isolation valve to transition from the fully open state to the closed state.

10. Method (50) according to claim 3, wherein, when the rollover valve (21) closure risk criterion is not satisfied, the isolation valve (22) is activated continuously.

11. Method (50) according to claim 2, wherein the maximum instantaneous flow rate (Qinst) is determined as a function of the pressure Pt inside the tank (10) and the pressure Pc in the vent circuit (20) after the isolation valve (22).

12. Method (50) according to claim 11, wherein the maximum instantaneous flow rate Qinst is determined according to the following expression:

$$Qinst = 295 \cdot Cv \cdot \sqrt{\frac{Pt^2 - Pc^2}{\rho \cdot T}}$$

where:
Cv is the coefficient of the isolation valve,
$\rho$ is the density of the fuel vapors relative to air,
T is the temperature inside the tank (10).

13. Method (50) according to claim 12, wherein, when the rollover valve (21) closure risk criterion is satisfied, the time separating the end of one activation of the isolation valve (22) and the beginning of the next activation is greater than the time required for said isolation valve to transition from the fully open state to the closed state.

14. Method (50) according to claim 11, wherein, when the rollover valve (21) closure risk criterion is satisfied, the time separating the end of one activation of the isolation valve (22) and the beginning of the next activation is greater than the time required for said isolation valve to transition from the fully open state to the closed state.

15. Method (50) according to claim 2, wherein, when the rollover valve (21) closure risk criterion is satisfied, the time separating the end of one activation of the isolation valve (22) and the beginning of the next activation is greater than the time required for said isolation valve to transition from the fully open state to the closed state.

16. Method (50) according to claim 2, wherein, when the rollover valve (21) closure risk criterion is not satisfied, the isolation valve (22) is activated continuously.

17. Method (50) according to claim 1, wherein, when the rollover valve (21) closure risk criterion is satisfied, the time separating the end of one activation of the isolation valve (22) and the beginning of the next activation is greater than the time required for said isolation valve to transition from the fully open state to the closed state.

18. Method (50) according to claim 1, wherein, when the rollover valve (21) closure risk criterion is not satisfied, the isolation valve (22) is activated continuously.

19. Electronic computer (30) for a motor vehicle, comprising means configured to control the pressure, inside a fuel tank (10) of said motor vehicle, in accordance with a method according to claim 1.

20. Motor vehicle comprising an electronic computer (30) according to claim 19.

* * * * *